United States Patent
Fantini et al.

(10) Patent No.: US 9,825,802 B2
(45) Date of Patent: Nov. 21, 2017

(54) MANAGEMENT OF SEAMLESS HANDOVER BETWEEN DIFFERENT COMMUNICATION SYSTEMS IN AN IP DUAL-MODE TERMINAL

(75) Inventors: Roberto Fantini, Turin (IT); Gaetano Francesco Cazzatello, Turin (IT); Alfredo Ruscitto, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 1703 days.

(21) Appl. No.: 12/312,181

(22) PCT Filed: Oct. 31, 2006

(86) PCT No.: PCT/EP2006/010468
§ 371 (c)(1),
(2), (4) Date: Jan. 15, 2010

(87) PCT Pub. No.: WO2008/052580
PCT Pub. Date: May 8, 2008

(65) Prior Publication Data
US 2010/0128696 A1 May 27, 2010

(51) Int. Cl.
*H04L 29/12* (2006.01)
*H04L 29/06* (2006.01)
(Continued)

(52) U.S. Cl.
CPC ...... *H04L 29/12028* (2013.01); *H04L 61/103* (2013.01); *H04L 69/16* (2013.01);
(Continued)

(58) Field of Classification Search
CPC .................................................. H04W 88/06
(Continued)

(56) References Cited

U.S. PATENT DOCUMENTS 7,478,173 B1 * 1/2009 Delco ................ H04L 12/2865
709/250
8,190,191 B2 * 5/2012 Livet ..................... H04W 88/06
370/331
(Continued)

FOREIGN PATENT DOCUMENTS

CN 1526247 A 9/2004
WO WO 02/43348 A1 5/2002
(Continued)

OTHER PUBLICATIONS

Perkins; "Network Working Group, Request for Comments: 2002", "IP Mobility Support", pp. 1-79, (1996).
(Continued)

*Primary Examiner* — Luat Phung
*Assistant Examiner* — Saad A Waqas
(74) *Attorney, Agent, or Firm* — Oblon, McClelland, Maier & Neustadt, L.L.P.

(57) ABSTRACT

A dual-mode terminal designed to connect to an IP-based network via a first communication system and a second communication system, the dual-mode terminal including a first physical network interface module adapted to establish a packet-based communication with the IP-based network via the first communication system, the first physical network interface module being accessible via a first physical network interface having a first physical network address; a second physical network interface module adapted to establish a packet-based communication with the IP-based network via the second communication system, the second physical network interface module being accessible via a second physical network interface having a second physical network address; an IP-based protocol stack adapted to operate between a software application in the dual-mode terminal and the first and second physical network interface modules; and a system for performing a seamless handover
(Continued)

between the first communication system and the second communication system during a connection to the IP-based network.

19 Claims, 2 Drawing Sheets

(51) Int. Cl.
    *H04W 36/00*     (2009.01)
    *H04W 8/26*     (2009.01)
    *H04W 36/14*     (2009.01)
    *H04W 80/04*     (2009.01)
    *H04W 88/06*     (2009.01)

(52) U.S. Cl.
    CPC ....... *H04L 69/161* (2013.01); *H04W 36/0033* (2013.01); *H04W 8/26* (2013.01); *H04W 36/14* (2013.01); *H04W 80/04* (2013.01); *H04W 88/06* (2013.01)

(58) Field of Classification Search
    USPC .......................................................... 370/331
    See application file for complete search history.

(56) References Cited

U.S. PATENT DOCUMENTS

| | | | |
|---|---|---|---|
| 2002/0194385 A1* | 12/2002 | Linder .................... | H04L 29/06 709/250 |
| 2004/0185887 A1 | 9/2004 | Wolmann et al. | |
| 2005/0013280 A1* | 1/2005 | Buddhikot ........ | H04L 29/12358 370/349 |
| 2005/0147062 A1* | 7/2005 | Khouaja ............... | H04W 36/30 370/332 |
| 2005/0185632 A1* | 8/2005 | Draves .................... | H04L 45/02 370/351 |
| 2005/0198384 A1 | 9/2005 | Ansari et al. | |
| 2005/0232206 A1* | 10/2005 | Chau ..................... | H04W 36/30 370/338 |
| 2006/0166699 A1* | 7/2006 | Aghvami ............ | H04L 12/5695 455/552.1 |
| 2006/0187881 A1* | 8/2006 | Kwak ............... | H04L 29/12311 370/331 |
| 2007/0156804 A1* | 7/2007 | Mo ......................... | H04W 8/02 709/200 |
| 2007/0160034 A1* | 7/2007 | Koretsky .......... | H04L 29/06027 370/352 |
| 2007/0268858 A1* | 11/2007 | Soto .................. | H04L 29/06027 370/328 |
| 2008/0096560 A1* | 4/2008 | Felske ............... | H04W 36/0083 455/436 |
| 2008/0125123 A1* | 5/2008 | Dorenbosch ...... | H04L 29/12047 455/436 |
| 2009/0170519 A1* | 7/2009 | Wilhoite .......... | H04M 3/42246 455/436 |

FOREIGN PATENT DOCUMENTS

| | | |
|---|---|---|
| WO | WO 02/103978 A2 | 12/2002 |
| WO | WO 03/065654 A1 | 8/2003 |
| WO | WO 2005/076651 A1 | 8/2005 |
| WO | WO 2005/117463 A2 | 12/2005 |
| WO | WO 2006/107669 A2 | 10/2006 |

OTHER PUBLICATIONS

Rubini et al.; "Network Drivers", Chapter 14, Linux Device Drivers, Second Edition, ed. O'Reilly, pp. 425-469, (2001).
Chinese Notification of Reexamination issued Jul. 17, 2014, in Chinese Patent Application No. 200680056674.7 (with English translation).
Office Action issued May 9, 2014 in Argentine Patent Application No. P07 01 04825 (submitting English translation only).

* cited by examiner

MANAGEMENT OF SEAMLESS HANDOVER BETWEEN DIFFERENT COMMUNICATION SYSTEMS IN AN IP DUAL-MODE TERMINAL

CROSS REFERENCE TO RELATED APPLICATION

This application is a national phase application based on PCT/EP2006/010468, filed Oct. 31, 2006, the content of which is incorporated herein by reference.

TECHNICAL FIELD OF THE INVENTION

The present invention relates in general to communications systems, and more particularly to the management of seamless handover between different communication systems in an IP dual-mode terminal, i.e., a dual-mode terminal providing connectivity to the Internet via different communication technologies.

BACKGROUND ART

As is known, a dual-mode mobile communication device is an apparatus designed to connect to different wireless communication networks, in particular to both cellular and non-cellular radio communication networks for voice and data communication. For example, a third-generation (3G) dual-mode mobile communication device can provide connectivity to the Internet through both a UMTS/W-CDMA cellular radio communication network and a WLAN (Wi-Fi) radio communication network based for example on the IEEE 802.11 specifications. The availability of dual-mode mobile communication devices providing both cellular (2G/3G) and WLAN connectivity, together with the worldwide deployment of WLAN hotspots, has raised the interest in possible solutions for the integration (inter-operability) of WLAN communication systems with 2.5G and 3G cellular communication systems, with the purpose of providing dual-mode mobile communication devices with the capability to employ multiple radio access networks (multiple-access capability) and to handover between different communication networks with a negligible impact on the quality of service (QoS) perceived by end-users (vertical handover).

Several approaches can be considered for combining different radio access technologies (RATs) depending on the level of integration that is required between the different networks. When the integration between the different RATs is tight, service provisioning is more efficient and the choice of the RAT that can provide the best radio access conditions is faster and easier. Another advantage of a tight RAT integration is the reduced time required for vertical handover between two different communication networks with a small impact on the QoS perceived by end-users. On the other hand, a high level of integration between two different communication networks requires a greater effort in the definition of interfaces and mechanisms that allow the necessary data exchange and signalling between the different RATs. In this case integration occurs at L2/L3 layer of the ISO-OSI protocol stack, as proposed for example in the Unlicensed Mobile Access (UMA) standard.

Even when there is no real integration between the RATs, vertical handover is possible thanks to the co-existence of the network access technologies under the Internet Protocol (IP). However, if no countermeasures are taken, problems arise when the user switches between different network access technologies and/or network access providers: since IP addresses are assigned to a fixed location in the network, a new IP address should be assigned when network location (access technology and/or provider) changes. This makes a transparent mobile access to the Internet impossible, leading to the IP applications to be restarted, with a consequent loss of the current session. Moreover, if the Transmission Control Protocol (TCP) is used in addition to the IP, as in the majority of IP links, the connections are further designated by a quadruplet of numbers containing indications about the IP addresses and the port numbers in the source and destination hosts. If one of these four numbers is changed, this causes an interruption of the TCP/IP connection.

In order to solve these problems, different techniques have been proposed which can be classified based on the layer of the ISO-OSI protocol stack at which the solution is provided, in particular can be classified into those providing a solution at the network layer (e.g., IP layer), those providing a solution at the transport layer (e.g., TCP/UDP (User Datagram Protocol), and those providing a solution at higher layers (e.g., the socket or application layer).

A solution that attempts to solve the problem of end-to-end host mobility at the network layer is represented by the so-called Mobile IP, which is an open standard, defined by the Internet Engineering Task Force (IETF) RFC 2002, that is part of both IPv4 and IPv6 standards and that allows users to keep the same IP address, stay connected, and maintain ongoing applications while roaming between IP networks. Mobile IP provides ubiquitous connectivity for users, and is scalable for the Internet because it is based on IP.

In more detail, Mobile IP attempts to solve host mobility problems at the network layer by using a level of routing indirection or triangular routing of all packets from a correspondent host to a mobile node.

This routing indirection is accomplished through the use of "Home Agents" and "Foreign Agents" that are proxies providing services to the mobile node. Although Mobile IP handles host mobility and reachability problems well, it does not handle transport connection failures (e.g., any changes to the transport endpoints leads to a session failure). Typically, applications depending on transport session connectivity need to be restarted and a new transport connection has to be established. Other disadvantages of Mobile IP include non-optimized triangular routing and extensive use of IP tunneling. Due to security reasons, service providers typically disallow tunneled packets. Furthermore, due to the increased frequency of Denial-Of-Service (DOS) attacks, incoming packets are ingress filtered by service providers to make sure that they are actually from the networks that they claim to be from and block those that spoof source addresses. Although the ingress filtering problem might be solved by using reverse tunneling, reverse tunneling leads to further suboptimal use of networking resources and adds extra packet delays between the two endpoints.

Solutions that attempt to solve the problem of end-to-end host mobility at the transport or higher layers typically either split the connection into multiple segments, modify a standard TCP implementation by adding new messages and states to the TCP state machine, or trick the application into believing that the connection still exists while an attempt is made to re-establish the connection.

For example, a solution that works at the transport layer level is the so-called Mobile Sockets (MSOCKS) which uses a split-connection proxy for connection redirection. MSOCKS inserts a proxy in the communication path between the mobile node and its correspondent hosts and uses a TCP splice mechanism to break the connection into multiple segments and thus hide the mobility issues of the mobile node from the correspondent hosts. However, adding a communication path proxy might significantly degrade service.

Other techniques at the transport layer level introduce a library between the application and the socket Application Programming Interface (API) that preserves the illusion of a single, unbroken connection over successive connection instances. All these approaches require linking the application with their respective (specific) libraries. The illusion of an unbroken connection is obtained by tricking the application into believing that the transport session is still active, even though the transport session has closed. The intermediate library then attempts to re-establish the (new) transport connection and maps the new transport connection to the application using it. The implementation of, and operational difficulties involved with, such solutions include virtualizing mechanisms like I/O polling, asynchronous and non-blocking I/O processes, the need for timers and signal handlers, and the need for additional process control interfaces such as "wait", "kill", and "exec".

A solution that works at the application layer level uses the Session Initiation Protocol (SIP). In this case, if the terminal needs to change its IP address during a session it can inform its correspondent host by sending a new INVITE message specifying the new IP address and the updated session parameters. Being at the application layer, SIP relies on the protocols and mechanism in the lower layer to handle the physical network connection. Therefore, additional procedures are needed in order to monitor the radio link layer quality and to attach the terminal to the new wireless network (thus obtaining the new IP address) before the SIP re-INVITE message is sent. Moreover, this mechanism is available only for those applications that rely on SIP for the management of the session and that are designed in order to support this IP change procedure.

A further solution provides a mechanism to achieve end-to-end host mobility by modifying the transport layer protocol and end applications. The modification adds new states and semantics to the TCP finite state machine and defines new TCP options to negotiate the migration of the connection. Other techniques exist that involve either changing the TCP header, packet format, protocol semantics, or adding additional headers in the packets. However, the disadvantage of these techniques is that the end-user applications have to be aware of the new feature to make use of it, implying required changes to those existing applications.

WO 02/43348 discloses a method for handover between heterogeneous communications networks, in particular for maintaining communication between a first mobile unit and a second unit, where the first unit communicates via a first communications network and the second unit communicates via a second communications network. The first unit includes a first protocol stack and the second unit includes a second protocol stack. The first unit includes a first session layer which is adapted to function as an interface between the first protocol stack and first software components acting within the first unit. Similarly, the second unit includes a second session layer which is adapted to function as an interface between the second protocol stack and second software components acting within the second unit. The first unit includes one or more first communications hardware with associated drive routines adapted to different communications networks. When the first unit switches from a first communications network to a third communications network, the first session layer functions to maintain communication by selecting first communications hardware and drive routine required for the third communications network. The respective identities of the first and second units are maintained by the first and the second session layer and these identities are retained during switching of communications networks by the first unit.

WO 2005/076651 discloses a method and a system for seamless handover of mobile devices in heterogeneous networks. A mobile device is moved between different topological network locations and transmits and/or receives data by means of different network access technologies without the data transfer between a Client IP application, running on the mobile device, and a Server IP application being interrupted, wherein the Client IP application of the mobile device makes a request with first data units to a client-service module, wherein the client service module creates second data units based on the received first data units and makes a request to a server-service module with the second data units, wherein the server-service module creates third data units based on the received second data units and makes a request to the Server IP application with the third data units to handle the data exchange between the Client IP application and the Server IP application.

A solution that works at the socket layer level and relates to an endpoint address change in a packet network is disclosed in US 2005/0198384, wherein a seamless transport endpoint mobility (STEM) architecture migrates a transport connection endpoint from an old IP address to a new IP address without loss of the session. The migration process is negotiated between two endpoints themselves. Transport endpoint mobility includes communication between two STEM daemons, one STEM daemon in each endpoint, which dynamically updates kernel data structures (e.g., elements of a 5-tuple associated with a TCP/IP application) associated with the session. Migration is transparent to the application using the underlying transport connection for data transfer.

WO 02/103978 discloses a method for mobile IP in heterogeneous networks in which an interface administration module of the mobile node checks the mobile node for available physical network interfaces, draws up a lookup table with the available and configurable physical network interfaces, and links itself to one of the available physical network interfaces. IP applications of the mobile nodes access the heterogeneous networks via a virtual IP network interface generated in the mobile node, the permanent virtual IP network interface being connected to the present network via the interface administration module. During the change of physical network interfaces of the mobile node, the linking of the permanent virtual IP network interface to the network is updated by means of the interface administration module based on the lookup table. In particular, the invention relates to a method for mobile nodes with real-time applications in heterogeneous networks.

WO 03/065654 discloses Internet-protocol-based wireless communication arrangements to allow mobile devices such as Personal Digital Assistants or mobile phones to connect to the Internet or another IP-based network using WPAN and WLAN infrastructures or cellular systems like GPRS or 3G. Wireless network driver software architecture is proposed, named Multi-standard Wireless Adaptation Layer (MWAL) and is for client devices MT that may be portable, need to efficiently switch from one wireless standard to another and that must be able to stay connected and reachable in the Internet or other IP based network even when switching between wireless communication standards. The technique is a layer-2 technique suitable for vertical markets and proprietary solutions, in which the MWAL enables the client device MT to perform vertical handovers between wireless communications standards.

OBJECT AND SUMMARY OF THE INVENTION

The Applicant has noted that despite all the aforementioned solutions, a need still remains for a solution that allows a handover between different network access technologies with session continuity, i.e. without delaying or interrupting active network applications or sessions, to be managed in a completely transparent and automatic manner.

This need is at least partly fulfilled by the present invention in that it relates to a dual-mode terminal designed to perform a seamless handover between different communication systems in the dual-mode terminal, as defined in the appended claims. The present invention further relates to an IP single-mode terminal designed to communicate with the dual-mode terminal and to support the seamless handover in the dual-mode terminal, and to a system and a software product for performing a seamless handover between different communication systems in the dual-mode terminal, as defined in the appended claims.

In particular, the present invention achieves the aforementioned need by introducing in an Operating System of the dual-mode terminal a network sub-layer comprising a virtual network interface, which is a software application that can process incoming and outgoing data packets, and is hosted in and run on a physical device, hereinafter referred to as physical network interface module. The physical network interface module is in charge of transmitting and receiving data packets and hosts a network interface driver which provides the Operating System with the services of the physical network interface module, hiding from the Operating System the actual transmission mechanism used by the physical network interface module.

In a preferred embodiment, the dual-mode terminal comprises two physical network interface modules that provide data packet transmission and reception through two different access technologies, in particular radio access technologies. The first physical network interface module is accessible by the Operating System of the dual-mode terminal through a first physical network interface, which has a first IP address, while the second physical network interface module is accessible through a second physical network interface which has a second IP address. Beside these two physical network interface modules, a virtual network interface module is provided in the dual-mode terminal, which is made by an appropriate module of the kernel of the Operating System of the dual-mode terminal. The virtual network interface module is accessible via a virtual network interface having a virtual IP address and receives and transmits incoming and outgoing data packets through the physical network interface modules, depending on which physical network interface module is experimenting the best propagation condition.

Another virtual network interface module accessible via a virtual network interface with an own virtual IP address is also provided in a remote terminal by an appropriate module of the kernel of the Operating System of the remote terminal, the virtual network interface dispatches data packets to/from a physical network interface included in the remote terminal and having an own IP address. Routing tables in the dual-mode terminal and in the remote terminal are stored in order to route data packets destined to the virtual IP addresses to the virtual network interfaces of the dual-mode terminal and of the remote terminal. When an application in the dual-mode terminal opens a connection with an application in the remote terminal, the dual-mode terminal will send data packets from its virtual IP address to the virtual IP address of the remote terminal. Specifically, the data packets are routed to the virtual network interface module in the dual-mode terminal, that changes the IP address associated to the data packets in such a manner that the destination IP address is changed to the IP address of the physical network interface in the remote terminal, and the source IP address is changed to the IP address of the physical network interface in the dual-mode terminal used for data transmission, i.e. the first IP address if the first physical network interface is used or the second IP address if the second physical network interface is used. Then, the data packets are routed through the Internet to the physical network interface module in the remote terminal, where they are received. The physical network interface module in the remote terminal is so configured that when data packets are received with a source IP address equal to one of the IP addresses of the physical network interfaces in the dual-mode terminal, then the data packets are passed to the virtual network interface module in the remote terminal. The virtual network interface module changes the IP address associated to the data packets in such a manner that the source IP address is changed from IP address of the physical network interface of the physical network interface module in the dual-mode terminal to the virtual IP address of the virtual network interface in the dual-mode terminal, and the destination IP address is changed from the IP address of the physical network interface of the physical network interface module in the remote terminal to the virtual IP address of the virtual network interface of the virtual network interface module in the remote terminal. Then, the data packets are passed by the virtual network interface module to the application that receives them. The same steps are followed when the remote terminal answers, sending IP data packets from its virtual network interface to that in the dual-mode terminal.

In order to carry out the steps previously described, the dual-mode terminal and the remote terminal has to exchange information about their physical and virtual IP addresses before starting the IP connection, and if the dual-mode terminal decides to change the physical network interface module used for data transmission and reception, it should inform the remote terminal that IP data packets will be received by the new IP address of the new physical network interface module rather then the previous one. The exchange of this information is managed by signalling software applications which run in the dual-mode terminal and the remote terminal, respectively.

BRIEF DESCRIPTION OF THE DRAWINGS

For a better understanding of the present invention, preferred embodiments, which are intended purely by way of example and are not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the scope of the present invention. Thus, the present invention is not intended to be limited to the embodiments shown, but is to be accorded the widest scope consistent with the principles and features disclosed herein and defined in the attached description and claims.

Figure 1:
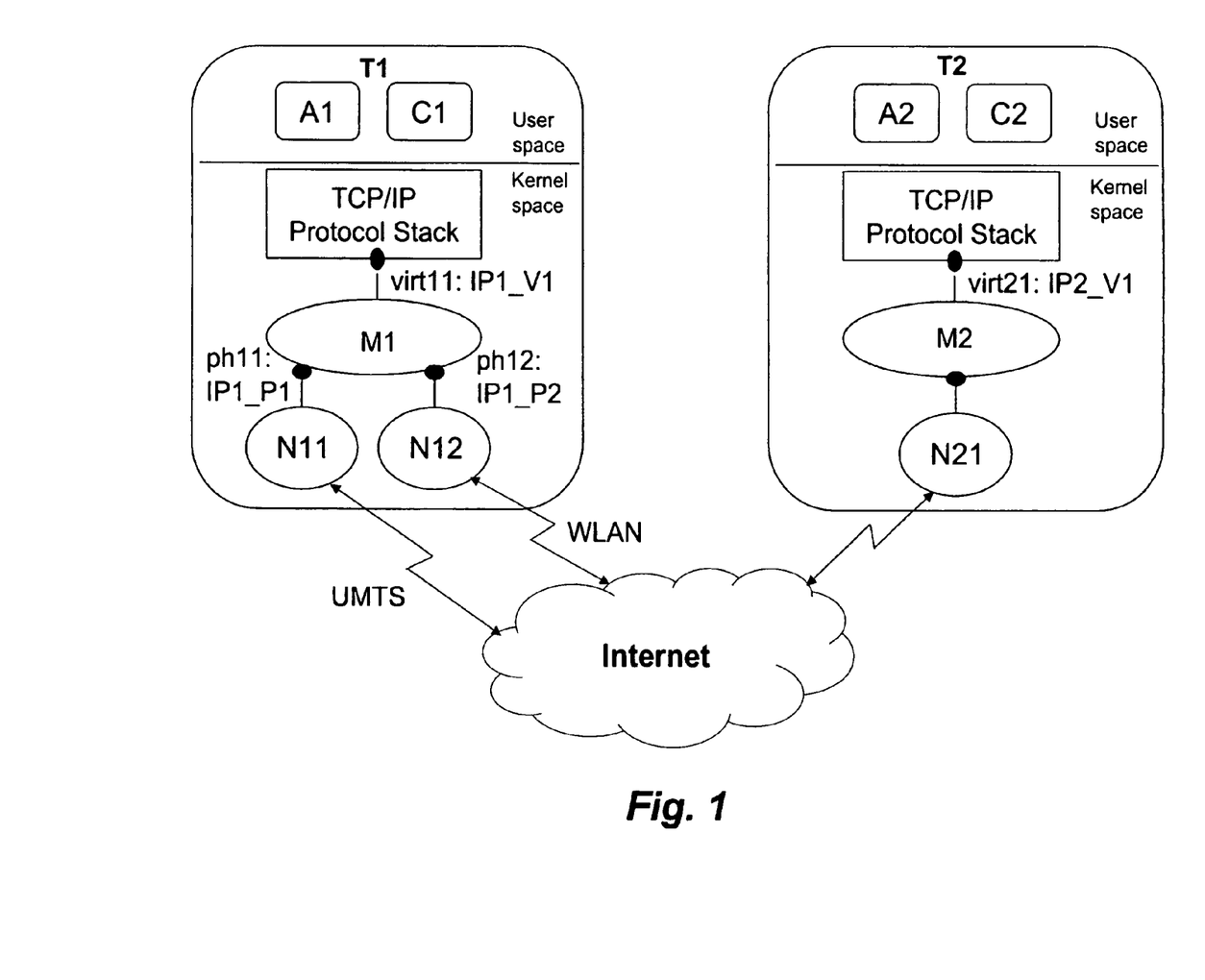
FIG. 1 shows a block diagram of a dual-mode terminal and a remote terminal configured to implement a seamless handover between different communication systems in the dual-mode terminal according to a preferred embodiment of the present invention.

FIG. 1 shows a block diagram of a dual-mode mobile terminal T1 and a remote mobile terminal T2 configured to communicate via an IP based network such as the Internet and to perform and support a seamless handover between different communication systems in the dual-mode terminal according to a preferred embodiment of the present invention.

The dual-mode terminal T1 and the remote terminal T2 are each provided with an Operating System having a kernel space responsible for terminal's resource allocation and management, and a user space responsible for user's software application execution management. In particular, the kernel space provides secure access to the terminal's hardware resources to various software applications and manages usage (when and how long) of the terminal's hardware resources by each software application.

In particular, the dual-mode terminal T1 comprises, in the kernel space:
- a first physical network interface module N11, in a preferred embodiment a Universal Mobile Telecommunication System (UMTS) module, accessible through a first physical network interface ph11 having a first IP address IP1_P1, and adapted to receive and transmit incoming and outgoing TCP/IP data packets through a first wireless communication network, in the embodiment considered a UMTS;
- a second physical network interface module N12, in a preferred embodiment a Wireless Local Area Network (WLAN) modem, accessible through a second physical network interface ph12 having a second IP address IP1_P2, and adapted to receive and transmit incoming and outgoing TCP/IP data packets through a second wireless communication network, in the embodiment considered a WLAN;
- a Transmission Control Protocol/Internet Protocol (TCP/IP) stack adapted to operate between user's software applications and the first and the second physical network interface modules N11, N12; and
- a virtual network interface virt11 having a virtual IP address IP1_V1, provided by a module, hereinafter referred to as virtual network interface module M1, of the kernel of the Operating System, adapted to operate between the TCP/IP protocol stack and the first and the second physical network interface modules N11, N12 to receive and transmit incoming and outgoing TCP/IP data packets through the physical network interface ph11 or ph12, depending on a predetermined resource management policy, e.g., depending on which physical network interface module N11 or N12 is experimenting the best propagation condition.

In further embodiments, the physical network interface modules can be adapted to communicate with the IP based network according to telecommunication systems other than UMTS or WLAN, for example according to one or more of the following: GSM, CDMA2000, WiMAX, Bluetooth, or any other suitable wireless or, less preferably, wireline communication system.

Similarly, the remote terminal T2, in the example shown in FIG. 1 a single-mode terminal, comprises, in the kernel space:
- a physical network interface module N21 accessible via a physical network interface ph21 having an IP address IP2_P1, and adapted to receive and transmit incoming and outgoing data packets through a wireless communication network. In a preferred embodiment, the physical network interface module N21 may be a UMTS module which connects to a UMTS communication network. In a different embodiment, the remote terminal T2 may be a server or a terminal connected to a Local Area Network (LAN). In the latter case, the physical network interface module N21 may be an Ethernet card which connects to the Local Area Network (LAN);
- a TCP/IP protocol stack adapted to operate between users software applications and the physical network interface module N21; and
- a virtual network interface virt21 having a virtual IP address IP2_V1 and provided by a module, hereinafter referred to as virtual network interface module M2, of the kernel of the Operating System adapted to operate between the TCP/IP protocol stack PS and the physical network interface module N21 to receive and transmit incoming and outgoing TCP/IP data packets through the physical network interface ph21.

Alternatively, the remote terminal T2 may be itself a dual mode terminal able to communicate with the IP based network through two different physical network interface modules, e.g., analogous to the previously described with respect to dual mode terminal T1.

In a preferred embodiment, each virtual IP address uniquely identifies the virtual network interface in the respective terminal. This virtual IP address can be assigned to the virtual network interface statically or dynamically through a connection with a remote server, e.g. a DHCP (Dynamic Host Configuration Protocol) server provided by a network operator. The connection with the remote server can be established through one of the physical network interfaces ph11 or ph12, as soon as the terminal is connected to the Internet.

The dual-mode terminal T1 and the remote terminal T2 each comprises, in the user space:
- one or more users software applications A1, A2, respectively; and
- a signalling software application, hereinafter referred to as connection manager C1, C2, respectively.

In particular, the connection manager C1 of the dual-mode terminal T1 has the following tasks:
- management of the first and the second physical network interfaces ph11 and ph12. In particular, the connection manager C1 dialogues with the WLAN and UMTS physical network interface modules N11 and N12 to monitor the link quality thereof. A decision on which interface is to be used for data packet transmission and reception may be based on reported received signal strength indicator (RSSI) values;
- management of active end-to-end connections. In particular, the connection manager C1 handles the connection with the remote terminals T2, and in general with all remote terminals that support IP session continuity, provides the remote terminal T2 with the virtual and physical IP addresses IP1_P1, IP1_P2, and IP1_V1 of the physical and virtual network interfaces ph11, ph12, and virt11 of the dual-mode terminal T1, and signals the switching between the physical network interfaces ph11 and ph12 when this event occurs. In a preferred embodiment, switching between the physical network interfaces ph11 and ph12 is signaled to the remote terminal T2 through a TCP connection that is always maintained on the UMTS network, since this network is more reliable than the WLAN one.

More in detail, regarding the first task, the connection manager C1 of the dual-mode terminal T1 dialogues with the UMTS and WLAN physical network interface modules N11 and N12 and periodically checks the status of the two connections, in order to decide which one is to be used for data transmission. The algorithm used to choose the best connection can be configured by the network operator. In a preferred embodiment, connection to the WLAN is chosen whenever it is available with a level of RSSI above a certain threshold that guarantees a good QoS. If the RSSI of the WLAN network drops below such a threshold, the connection manager Cl checks the presence of the UMTS network and switches the virtual network interface virt11 of the dual-mode terminal T1 to the UMTS network. In another embodiment, a double threshold can be used: when the RSSI of the WLAN network drops below a first threshold, the connection manager C1 checks the presence of the UMTS network and begins to send short dummy data packets in order to "warm up" the connection. This is done in order to prevent the additional delay introduced by the UMTS network in the establishment of the data connection. By means of these dummy data packet transmission, the UMTS link will be fully operational and responsive when the link switch will be required. Link switching occurs if the RSSI of the WLAN continues to drop and goes below a second threshold.

Additional or alternative resource management policies may be adopted to select the connection to be used for data transmission, e.g., when both the connections experiment a good transmission quality, for example to optimize the usage of the radio resources available on the two communication systems linked to the respective network interfaces.

Figure 2:
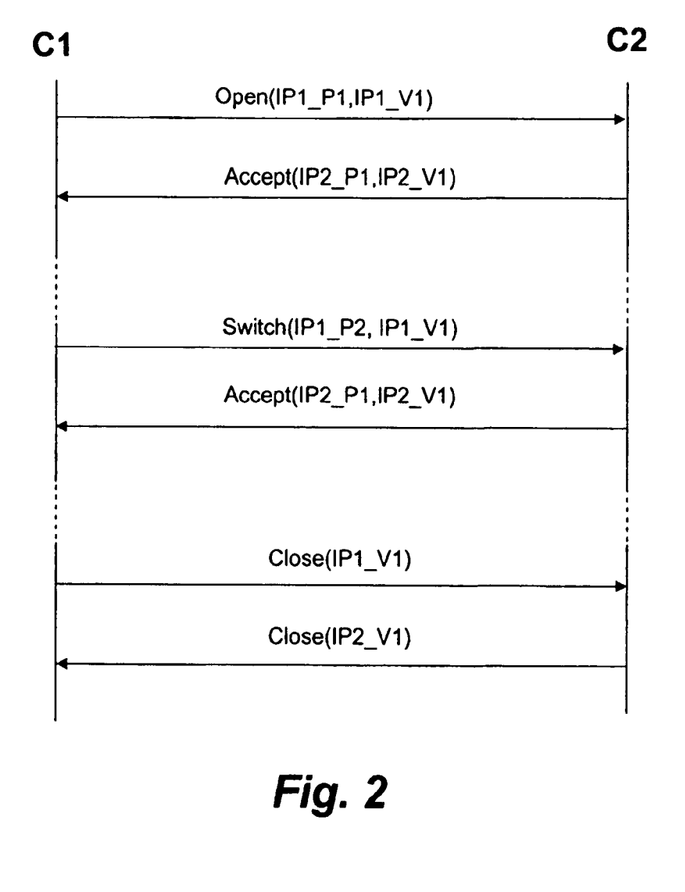
FIG. 2 shows messages exchanged between the dual-mode terminal and the remote terminal during an IP session.

Regarding the second task, the connection manager C1 of the dual-mode terminal T1 exchanges signaling information with the connection manager C2 of the remote terminal T2. FIG. 2 shows the messages exchanges between the connection managers C1 and C2 of the dual-mode terminal T1 and the remote terminal T2 during a communication session.

Whenever an application A1 running on the dual-mode terminal T1 requests that a connection is opened with a remote terminal that supports IP session continuity, in the example shown in FIG. 1 the remote terminal T2, the connection manager C1 sends to the connection manager C2 an "open message" containing a request to open the connection. Assuming that the connection manager C1 decides that the first physical network interface ph11 provides the best connection, the open message is in the form "Open (IP1_P1,IP1_V1)", wherein the IP address of the first physical network interface ph11 in the dual-mode terminal T1 that will be used for the data packet transmission, and the IP address of virtual network interface virt11 in the dual-mode terminal T1 are specified. In this way, the remote terminal T2 is informed that the dual-mode terminal T1 wishes to start an IP session, and that the dual-mode terminal T1 uses a virtual network interface with IP address IP1_V1 that transmits data packets through a physical network interface with IP address IP1_P1. This first message comprises a signaling data packet which is sent through a TCP channel over the most reliable link, e.g. the UMTS link if the dual-mode terminal T1 is a 3g-WLAN dual mode handset, and which is received by the physical network interface module N21 of the remote terminal T2.

In a preferred embodiment, the driver of the physical network interface module N21 monitors all data packets received and passes them to a function, hereinafter referred to as virt_change function, which is exported by the module M2 of the kernel space of the Operating System of the remote terminal T2, and which checks if the received data packets are addressed to the TCP port of the remote terminal T2 where the connection manager C2 is waiting for messages. If this is the case, the virt_change function parses the message and extracts the information that is needed by the module M2 to run properly. With this solution, the module M2 reads the signaling information exchanged between connection managers C1 and C2 and configures itself independently. The connection manager C2 replies to the dual-mode terminal T1 with an "accept message" containing an acceptance report in the form "Accept(IP2_P1,IP2_V1)", wherein the IP address IP2_V1 of the virtual network interface virt21 in the remote terminal T2 and the IP address IP2_P1 of the physical network interface ph21 in the remote terminal T2 are specified.

In another embodiment, the open request is received by the connection manager C2, which configures the module M2 through a suitable method (e.g. ioctl call, see "Linux Device Drivers", by J. Corbet, A. Rubini, G. Kroah-Hartman, ed. O'Reilly) exposed by the virtual driver, and then replies with the accept message.

The accept message is received by a preferred physical network interface ph11 or ph12 of the dual-mode terminal T1, e.g. the UMTS physical network interface ph11. In a preferred embodiment, the physical network interface driver monitors all data packets received and passes them to a virt_change function, which is exported by the module M1 of the kernel space of the Operating System of the dual-mode terminal T1, and which, based on the information in the accept message, configures itself to manage the real and the virtual IP addresses of the physical and virtual network interfaces ph21 and virt21 of the remote terminal T2 and which will be used for data packet transmission and reception with the remote terminal T2.

Whenever the connection manager C1 determines that the physical network interface currently used for data packet transmission and reception is to be changed, it sends a "switch message" containing a request to switch the connection. Assuming that the connection manager C1 decides that now the second physical network interface ph12 provides the best connection, the switch message is in the form "Switch(IP1_P2,IP1_V1)", wherein the IP address of the second physical network interface p12 in the dual-mode terminal T1 that will be used for the data packet transmission, and the IP address of virtual network interface virt11 in the dual-mode terminal T1 are specified.

The switch message is received by the remote terminal T2, and is used by the module M2 to configure itself to perform the correct address switch. Connection manager C2 then replies to the dual-mode terminal T1 with an "accept message" containing an acceptance report in the form "Accept(IP2_P1,IP2_V1)", and which is used by the module M1 in the dual-mode terminal T1 to complete the switching.

Connection with the remote terminal T2 can be closed by the dual-mode terminal T1 with a "close message" containing a request to switch the connection, and in the form "Close(IP1_V1)". This message informs the module M2 in the remote terminal T2 that it should stop changing IP addresses of message sent to or received from the virtual IP address IP1_V1.

Finally, the remote terminal T2 replies with a corresponding "close message" containing a request to switch the connection, and in the form "Close(IP2_V1)". This message informs the module M1 in the dual-mode terminal T1 that it can close the connection, stopping IP address change for data packets sent to or received from the virtual address IP2_V1 of the remote terminal T2.

The low-level processing of IP data packets sent and received by the two terminals T1 and T2 is performed by the modules M1 and M2, which are loaded in the terminals T1 and T2 and configured at load time to be attached to the real physical devices of the terminal T1 and T2 and to monitor the signaling information on the correct TCP port. The modules M1 and M2 enable a virtual network interface virt1 or virt2 that is associated with the virtual IP address, and offer one or more of the typical functions (e.g., init, open, stop, etc.) necessary for a virtual network interface driver, in addition to the functionality necessary to implement the IP address change and physical network interface switching. In particular, in a preferred embodiment, the core of these functionalities is provided by three functions hereinafter referred to as virt_change, virt_hw_tx and virt_header.

In particular, virt_change is a function exported from the module M1, M2, that is called from the physical network interface drivers every time that they receive data packets. To call this function, the driver of the physical network interface, just before processing the received data packets, forwards them to the virt_change function, which checks if the data packets are packets generated by the connection managers C1 or C2 and, if this is the case, interprets the commands exchanged between the two terminals T1 and T2 as previously described. In a preferred embodiment, the driver of the virtual network interface keeps track of every active peer-to-peer connection that is managed by the connection managers C1 and C2 by means of a matrix, called VirtualVsReal matrix, which memorizes couples of virtual and real IP addresses. The virt_change function reads the virtual IP address received in the accept message, and if no occurrence of the virtual IP is present in the matrix it records the new Virtual IP vs Real IP pair. If the Virtual IP is present, but the Real IP is different because a switching is in progress, the driver of the virtual network interface records the new IP couple in the matrix. The virt_change function is also in charge with changing the IP address in received data packets. For every received IP data packet, the virtual network interface driver checks if the source address is one of the real IP address registered in the matrix, and if this is the case, it changes the source address to the corresponding virtual address, and the destination address from the real IP to its own virtual IP address. If necessary, after having changed the IP addresses, the virtual network interface driver recalculates the TCP/UDP checksum, so that the Operating System does not discard the manipulated data packet.

While data packet manipulation on the receiving side is entirely managed by virt_change function, the equivalent process on the transmitting side is handled by two functions: virt_hw_tx and virt_header. The function virt_hw_tx implements the manipulation of the source and destination addresses, and the queuing of the packets so modified in the correct physical network interface queue. The function controls the destination address in the Virtual part of the VirtualVsReal matrix and if it finds a correspondence, it changes the destination address with the Real Address, and the source address with the IP address of the physical network interface that the connection manager signaled as the currently used physical network interface. After IP address change, UDP or TCP checksum are recalculated and the data packet is transmitted through the currently used physical network interface. Before transmitting the data packets, it is necessary to append the Layer 2 header to the data packets. The format of the Layer 2 header depends on the used physical network interface. The virt_header function addresses this problem, modifying the Layer 2 header accordingly to the physical network interface that should be used.

Although the method and apparatus of the present invention has been illustrated and described with regard to presently preferred embodiments thereof, it will be understood that numerous modifications and substitutions may be made to the embodiments described, and that numerous other embodiments of the invention may be implemented without departing from the spirit and scope of the invention as defined in the following claims.

The invention claimed is:

1. A dual-mode terminal designed to connect to an internet protocol-based network via first and second communication systems, the dual-mode terminal comprising
  a first physical network interface module configured to establish a packet-based communication with the internet protocol-based network via the first communication system, the first physical network interface module having associated therewith a first physical network address;
  a second physical network interface module configured to establish a packet-based communication with the internet protocol-based network via the second communication system, the second physical network interface module having associated therewith a second physical network address;
  a first internet protocol-based protocol stack configured to operate between a software application in the dual-mode terminal and the first and second physical network interface modules;
  a system for performing a seamless handover between the first and the second communication systems including a first virtual network interface module having associated therewith a first virtual network address; and
  a first connection management application configured to manage the first and second physical network interface modules, and the connection between the dual-mode terminal and the internet protocol-based network, wherein
  the first internet protocol-based protocol stack is configured to generate data packets having a source physical network address equal to the first virtual network address associated with the first virtual network interface module;
  the first virtual network interface module is configured to change the source physical network address of data packets from the first internet protocol-based protocol stack to one of the first and second physical network addresses associated with one of the first and second physical network interface modules;
  the first and the second physical network interface modules in the dual-mode terminal are a mobile telecommunication system physical network interface module and a wireless local area network physical network interface module, respectively; and
  the first connection management application is configured to:

cause the dual-mode terminal to connect to the internet protocol-based network via the wireless local area network physical network interface module when a received signal strength indicator is higher than a first predetermined threshold, check the presence of the mobile telecommunication system network, in case of a positive outcome, send dummy data packets via the mobile telecommunication system physical network interface module, so as to warm up the connection to the mobile telecommunication system network and prevent the additional delay introduced by the latter in the establishment of the data connection, when the received signal strength indicator drops below the first predetermined threshold, and switch to the mobile telecommunication system physical network interface module when the received signal strength indicator drops below a second predetermined threshold lower than the first predetermined threshold.

2. The dual-mode terminal of claim 1, wherein the first connection management application is configured to:

determine which one between the first and the second communication systems in the dual-mode terminal is to be used for the connection to the internet protocol-based network, and perform the seamless handover between the first and the second communication systems so as to maintain an internet protocol session continuity.

3. The dual-mode terminal of claim 2, wherein the first connection management application is configured to cooperate with the first and second physical network interface modules to determine which one between the first and the second communication systems experiments the best propagation condition for the connection to the internet protocol-based network.

4. The dual-mode terminal of claim 3, wherein the received signal strength indicator indicates which one between the first and the second communication systems experiments the best propagation condition.

5. The dual-mode terminal of claim 1, wherein the first connection management application is configured to manage the transmission, through one of the first and second communication systems and the internet protocol-based network, of the first virtual network address, of the first and second physical network addresses, and of information about occurrence of a switching between the first and the second communication systems.

6. The dual-mode terminal of claim 1, wherein the mobile telecommunication system physical network interface module is a universal mobile telecommunication system physical network interface module.

7. The dual-mode terminal of claim 1, wherein the mobile telecommunication system network is a universal mobile telecommunication system network.

8. A single-mode terminal designed to establish a packet-based communication with a dual-mode terminal, the dual-mode terminal designed to connect to an internet protocol-based network via first and second communication systems including a first physical network interface module configured to establish a packet-based communication with the internet protocol-based network via the first communication system, the first physical network interface module having associated therewith a first physical network address; a second physical network interface module configured to establish a packet-based communication with the internet protocol-based network via the second communication system, the second physical network interface module having associated therewith a second physical network address; a first internet protocol-based protocol stack configured to operate between a software application in the dual-mode terminal and the first and second physical network interface modules; a system for performing a seamless handover between the first and the second communication systems including a first virtual network interface module having associated therewith a first virtual network address; and a first connection management application configured to manage the first and second physical network interface modules, and the connection between the dual-mode terminal and the internet protocol-based network, wherein the first internet protocol-based protocol stack is configured to generate data packets having a source physical network address equal to the first virtual network address associated with the first virtual network interface module; the first virtual network interface module is configured to change the source physical network address of data packets from the first internet protocol-based protocol stack to one of the first and second physical network addresses associated with one of the first and second physical network interface modules; the first and the second physical network interface modules in the dual-mode terminal are a mobile telecommunication system physical network interface module and a wireless local area network physical network interface module, respectively; and the first connection management application is configured to: cause the dual-mode terminal to connect to the internet protocol-based network via the wireless local area network physical network interface module when a received signal strength indicator is higher than a first predetermined threshold, check the presence of the mobile telecommunication system network, in case of a positive outcome, send dummy data packets via the mobile telecommunication system physical network interface module, so as to warm up the connection to the mobile telecommunication system network and prevent the additional delay introduced by the latter in the establishment of the data connection, when the received signal strength indicator drops below the first predetermined threshold, and switch to the mobile telecommunication system physical network interface module when the received signal strength indicator drops below a second predetermined threshold lower than the first predetermined threshold, the single-mode terminal comprising a third physical network interface module configured to establish a packet-based communication with the internet protocol-based network via a third communication system, the third physical network interface module having associated therewith a third physical network address;

a second internet protocol-based protocol stack configured to operate between a software application in the single-mode terminal and the third physical network interface module;

a system for maintaining internet protocol session continuity during a connection to the dual-mode terminal via the internet protocol-based network including a second virtual network interface module having associated therewith a second virtual network address, wherein the second internet protocol-based protocol stack is configured to generate data packets having a source physical network address equal to the second virtual network address associated with the second virtual network interface module, and a destination physical network address equal to the first virtual network address of the first virtual network interface module; and the second virtual network interface module is configured to change the source physical network address of data packets from the second internet protocol-based protocol stack to the third physical network address associated with the third physical network interface module, and the destination physical network address of data packets from the second internet protocol-based protocol stack to one of the first and second physical network addresses associated with the third physical network interface module.

9. The single-mode terminal of claim 8, wherein the second virtual network interface module is configured to change the source physical network address of data packets received from the dual-mode terminal to the first virtual network address associated with the first virtual network interface module and the destination physical network address of data packets received from the dual-mode terminal to the second virtual network address associated with the second virtual network interface module.

10. The single-mode terminal of claim 8, wherein the third physical network interface module is configured to check whether the source physical network address of received data packets matches one of the physical network addresses associated with the first and second physical network interface modules, and to pass the received data packets to the second virtual network interface module in case of positive match.

11. The single-mode terminal of claim 8, wherein said system for maintaining internet protocol session continuity further comprises a second connection management application configured to manage the third physical network interface module, and the connection between the single-mode terminal and the internet protocol-based network.

12. The single-mode terminal of claim 11, wherein the second connection management application further is configured to manage the transmission to the dual-mode terminal, through the third communication system, and the internet protocol-based network, of the second virtual network address associated with the second virtual network interface module, and of the third network address associated with the third network physical interface module.

13. The single-mode terminal of claim 11, wherein the second connection management application further is configured to manage the reception from the dual-mode terminal, through the third communication system, and the internet protocol-based network, and allocate utilization, by the second virtual network interface module, of the first virtual network address associated with the first virtual network interface module of the first and second network addresses associated with the first and second network physical interface modules, and of information about occurrence of a switching between the first and the second communication systems in the dual-mode terminal.

14. A dual-mode terminal for communicating with a single-mode terminal designed to establish a packet-based communication with the dual-mode terminal via an internet protocol-based network, the dual-mode terminal comprising:
a first physical network interface module configured to establish a packet-based communication with the internet protocol-based network via a first communication system, the first physical network interface module having associated therewith a first physical network address;
a second physical network interface module configured to establish a packet-based communication with the internet protocol-based network via a second communication system, the second physical network interface module having associated therewith a second physical network address;
a first internet protocol-based protocol stack configured to operate between a software application in the dual-mode terminal and the first and second physical network interface modules;
a system for performing a seamless handover between the first and the second communication systems including a first virtual network interface module having associated therewith a first virtual network address; and
a first connection management application configured to manage the first and second physical network interface modules, and the connection between the dual-mode terminal and the internet protocol-based network, wherein
the first internet protocol-based protocol stack is configured to generate data packets having a source physical network address equal to the first virtual network address associated with the first virtual network interface module;
the first virtual network interface module is configured to change the source physical network address of data packets from the first internet protocol-based protocol stack to one of the first and second physical network addresses associated with one of the first and second physical network interface modules;
the first and the second physical network interface modules in the dual-mode terminal are a mobile telecommunication system physical network interface module and a wireless local area network physical network interface module, respectively;
the first connection management application is configured to:
cause the dual-mode terminal to connect to the internet protocol-based network via the wireless local area network physical network interface module when a received signal strength indicator is higher than a first predetermined threshold,
check the presence of the mobile telecommunication system network,
in case of a positive outcome, send dummy data packets via the mobile telecommunication system physical network interface module, so as to warm up the connection to the mobile telecommunication system network and prevent the additional delay introduced by the latter in the establishment of the data connection, when the received signal strength indicator drops below the first predetermined threshold, and
switch to the mobile telecommunication system physical network interface module when the received signal strength indicator drops below a second predetermined threshold lower than the first predetermined threshold;
the single-mode terminal includes:
a third physical network interface module configured to establish a packet-based communication with the internet protocol-based network via a third communication system, the third physical network interface module having associated therewith a third physical network address;
a second internet protocol-based protocol stack configured to operate between a software application in the single-mode terminal and the third physical network interface module;
a system for maintaining internet protocol session continuity during a connection to the dual-mode terminal via the internet protocol-based network including a second virtual network interface module having associated therewith a second virtual network address;

the second internet protocol-based protocol stack is configured to generate data packets having a source physical network address equal to the second virtual network address associated with the second virtual network interface module, and a destination physical network address equal to the first virtual network address of the first virtual network interface module;

the second virtual network interface module is configured to change the source physical network address of data packets from the second internet protocol-based protocol stack to the third physical network address associated with the third physical network interface module, and the destination physical network address of data packets from the second internet protocol-based protocol stack to the physical network address associated with the third physical network interface module, via the internet protocol-based network;

the first internet protocol-based protocol stack is configured to generate data packets having a destination physical network address equal to the second virtual network address associated with the second virtual network interface module; and the first virtual network interface module is configured to change the destination physical network address of data packets from the first internet protocol-based protocol stack to the third physical network address associated with the third physical network interface module.

15. The dual-mode terminal of claim 14, wherein the first virtual network interface module is configured to change the source physical network address of data packets from the single-mode terminal to the second virtual network address associated with the second virtual network interface module, and the destination physical network address of data packets from the single-mode terminal to the first virtual network address associated with the first virtual network interface module.

16. The dual-mode terminal of claim 14, wherein the physical network interface modules in the dual-mode terminal are configured to:
check whether the source physical network address of received data packets matches the third physical network address associated with the third physical network interface module, and
pass the received data packets to the first virtual network interface module in case of positive match.

17. The dual-mode terminal of claim 14, wherein the first connection management application is configured to manage the reception from the single-mode terminal through one of the first and second communication systems and the internet protocol-based network and allocate utilization, by the first virtual network interface module, of the second virtual network address associated with the second virtual network interface module and of the third network address associated with the third physical network interface module.

18. A communication system comprising
the dual-mode terminal of claim 1, and
a single-mode terminal designed to establish a packet-based communication with the dual-mode terminal as the receiving terminal via the internet protocol-based network, wherein
the single-mode terminal includes:
a third physical network interface module configured to establish a packet-based communication with the internet protocol-based network via a third communication system, the third physical network interface module having associated therewith a third physical network address;
a second internet protocol-based protocol stack capable of being adapted to operate between a software application in the single-mode terminal and the third physical network interface module; and
a system for maintaining internet protocol session continuity during a connection to the dual-mode terminal via the internet protocol-based network including a second virtual network interface module having associated therewith a second virtual network address;
the second internet protocol-based protocol stack is configured to generate data packets having a source physical network address equal to the second virtual network address associated with the second virtual network interface module, and a destination physical network address equal to the first virtual network address of the first virtual network interface module;
the second virtual network interface module is configured to change the source physical network address of data packets from the second internet protocol-based protocol stack to the third physical network address associated with the third physical network interface module, and the destination physical network address of data packets from the second internet protocol-based protocol stack to the physical network address associated with the third physical network interface module; and
the dual-mode terminal and the single-mode terminal are both configured to establish a connection via an internet protocol-based network.

19. A non-transitory software product capable of being loaded and run in a dual-mode terminal of claim 1, comprising software code portions capable of causing the dual-mode terminal to connect to an internet protocol-based network via first and second communications systems.

* * * * *